E. Hovenden,

Feed Trough.

No. 111,122. Patented Jan. 24, 1871.

Witnesses
H. H. Wells
John Mason

Edward Hovenden
Inventor
by Edward Thurston his Atty in fact

United States Patent Office.

EDWIN HOVENDEN, OF BUSHNELL, ILLINOIS.

Letters Patent No. 111,122, dated January 24, 1871.

IMPROVEMENT IN FEED-TROUGH GUARDS.

The Schedule referred to in these Letters Patent and making part of the same.

*To all whom it may concern:*

Be it known that I, EDWIN HOVENDEN, of Bushnell, in the county of Macdonough and in the State of Illinois, have invented a Feeding-trough Guard or Cover for Hogs, Cattle, &c; and do hereby declare that the following is a full, clear, and exact description thereof, reference being had to the annexed drawing making a part of this specification, in which like letters of reference refer to like parts, and in which—

Figure 1:
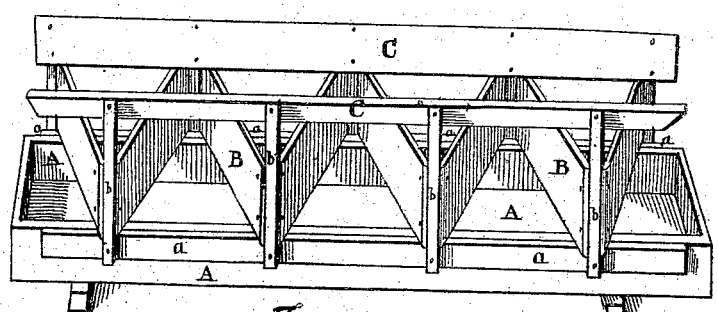
Figure 4:
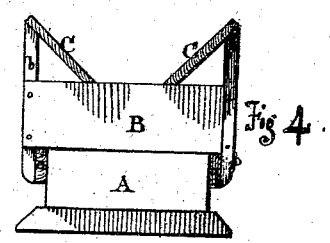
Figure 2:
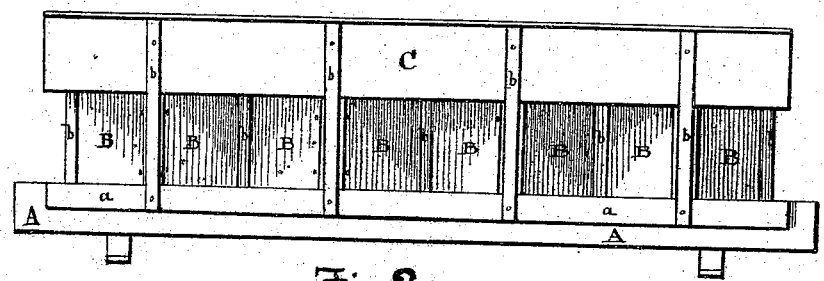
Figure 3:
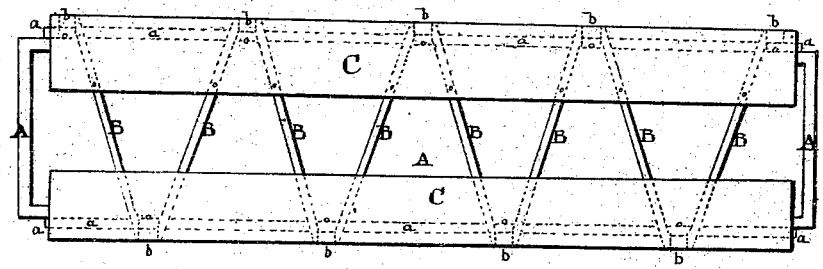

Figure 1 represents a perspective view.
Figure 2, a longitudinal elevation.
Figure 3, a plan.
Figure 4, end elevation.

This device is composed of short boards, B B, &c., placed endwise and diagonally across a feeding-trough for hogs, cattle, &c., and joined at their ends or to a standard, $b\,b$, &c., alternately on opposite sides of the trough, so as to form an opening between them for the heads of the feeding animals alternately on either side of the same without loss of room. The whole forms a "zigzag" arrangement of partitions.

A represents the feeding-trough.

B B B, &c., the partitions of the guard, which may be made of any height, and running across the trough, and fastened at the edge of the latter to an upright piece, $b\,b$, &c., which is fastened in turn to horizontal strips, $a\,a$, &c., on each side of the trough if the guard is intended to be movable.

The uprights $b\,b$, &c., are not placed opposite to each other, but in the manner shown in the plan, fig. 3.

The partitions B B, &c., may be constructed and placed in other positions across the trough, for instance, at right angles across the latter, and the alternate openings on each side boarded up; but the zigzag arrangement is the best.

If the guard is intended or wanted to be a fixture to the trough the uprights $b\,b$, &c., can be nailed to the sides of the former.

By the plan shown in the drawing the pieces $a\,a$, &c., running the whole length of the trough, and to which the uprights $b\,b$, &c., are fastened, form the frame of the same, by means of which the guard is held to its position when applied to the feeding-trough, and allowing the same to be quickly removed from the trough for the purpose of cleaning the latter.

C C are two sloping boards, running the whole length of the "guard," their lower inner edges resting near the outer ends of the divisions and on the partitions, and at such a distance asunder that they will convey slop or feed to the center of the trough through the partitions. For this purpose the boards "flare" outward, as shown in fig. 4. These boards C C are not important, and may be added or omitted, as desired, in the construction and use of the guard.

The operation of this device needs little or no explanation.

The openings allow but one animal at a time to put its head into the trough, which openings are made of such a size as to prevent the animal from introducing his feet therein; neither can hogs run over the trough or along it, as they do when no guard is used, the partitions preventing this habit. When it is desired to clean the trough the guard can be removed, as the pieces $a\,a$, &c., merely embrace each side of the trough.

What I claim as my invention is—

1. The zigzag partitions B B, &c., or equivalent divisional pieces forming alternate feed-openings on either side of a feed-trough, as a hog or cattle guard, substantially as and for the purposes described.

2. The combination of the partitions B B, or equivalent arrangement of divisions, with the uprights $b\,b\,b$, &c., and the slop-boards C C, all substantially as described, and for the purposes set forth.

In testimony that I claim the foregoing feeding-trough guard I have hereunto set my hand this 17th day of November, 1870.

EDWIN HOVENDEN.

Witnesses.
HENRY W. WELLS,
THOMAS TAYLOR.